United States Patent Office 2,977,524
Patented Mar. 28, 1961

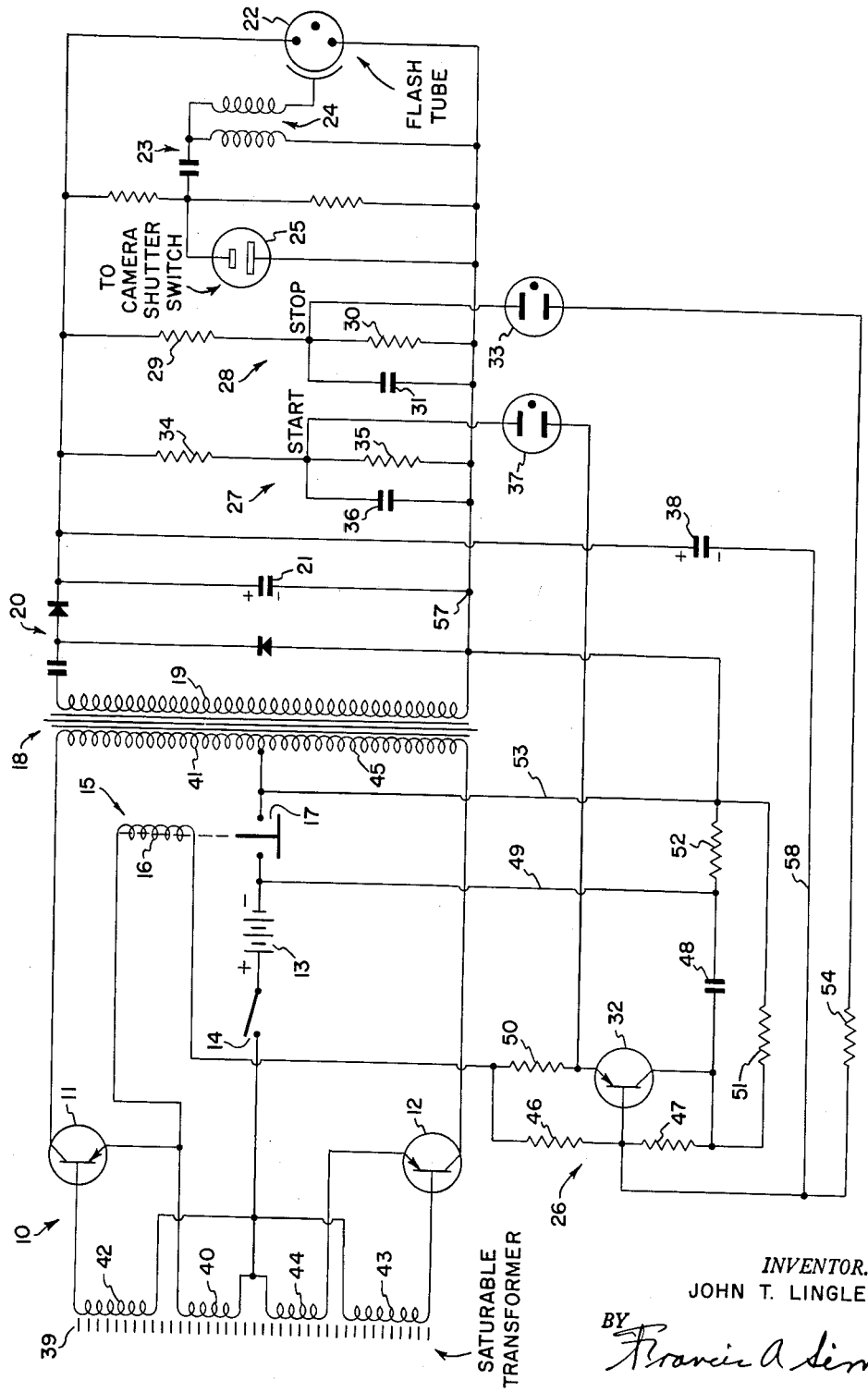

2,977,524

ELECTRICAL POWER SUPPLY APPARATUS

John T. Lingle, Ramsey, Minn., assignor to Minneapolis-Honeywell Regulator Company, Minneapolis, Minn., a corporation of Delaware Filed Apr. 20, 1959, Ser. No. 807,476

5 Claims. (Cl. 320—1)

The present invention is concerned with an improved electric apparatus and particularly with an electric apparatus for use in charging a capacitor. Specifically, the present invention is concerned with an arrangement whereby a high voltage capacitor is charged from a low voltage battery and in which the charging of the capacitor is controlled by a relay, the relay in turn being controlled between its energized and de-energized states in cyclic manner to maintain the capacitor charged with a minimum of battery energy drain. The present application discloses the present invention as used in charging the main storage capacitor of an electronic photographic flash unit.

In the photographic art, one type of electronic photographic flash unit which has found wide acceptance is the type which derives its operating voltage from a plurality of small, inexpensive, low voltage batteries, commonly called flash-light batteries or D cells. The low voltage derived from these batteries is converted to an alternating voltage by means of an oscillator or inverter, either electronic or mechanical, including an output transformer. Rectifying means are then provided to convert the alternating voltage to a high voltage D.C. to charge the main storage capacitor of the flash unit. As can be readily appreciated, once the main storage capacitor has been charged, the continued operation of the oscillator consumes energy of the low voltage batteries.

The present invention is concerned with the conserving of battery energy. Furthermore, the present invention accomplishes a shorter recycle time. The term "recycle time," when related to an electronic flash unit, denotes the period of time from one flash of the electronic flash tube until the main storage capacitor has again become fully charged so that the flash tube may again be flashed. The present invention achieves a short recycle time by providing a charging means for the main storage capacitor which is capable of charging the capacitor to a voltage which exceeds its operating voltage. A relay which is responsive to the state of charge of the main storage capacitor is provided to disconnect the oscillator or inverter from the low voltage battery as the capacitor voltage reaches the operating voltage. In this manner, the storage capacitor reaches its operating voltage very rapidly, to give a short recycle time, and the battery itself is disconnected to give longer battery life.

Specifically, the present invention provides a transistor type oscillator having a low voltage input and which receives its input or operating voltage from a low voltage battery source and which provides at its output a high voltage A.C. This high voltage A.C. is applied to a main storage capacitor through rectifying means. A first resistor-capacitor type network, having a short time constant, is connected to the main storage capacitor. This first network is connected in controlling relation to a relay. This relay, when energized, connects the oscillator input to the low voltage battery source to charge the capacitor. However, upon the capacitor reaching a given charge, the first resistor-capacitor network is effective to de-energize the relay and thereby disconnect the low voltage battery from the oscillator input to stop the charging of the capacitor. A second resistor-capacitor network, having a long time constant, is provided and is also connected to the main storage capacitor. At some later time, this second network is effective to cause the relay to be again energized to thereby reconnect the low voltage battery to the oscillator input to re-establish the charging of the main storage capacitor. In this manner, the first and second resistor-capacitor networks are effective to cyclically cause a charging voltage to be applied to the main storage capacitor. When the electronic flash tube is flashed, to thereby discharge the main storage capacitor, further means are provided to immediately cause the relay to be energized to recharge the main storage capacitor.

Turning now to a description of the present invention, the single figure disclosed a schematic representation of the preferred embodiment of the present invention.

In this single figure the reference numeral 10 designates an oscillator means including transistors 11 and 12 which derive their operating voltage from a low voltage source 13. The operation of oscillator 10 is controlled by means of a main on-off switch 14 and also by means of a relay 15 having a winding 16 and a normally open switch 17 in series with battery 13. The relay 15 is shown with its winding de-energized, in which condition switch 17 is open.

The operation of the oscillator 10 is such that upon switch 17 being closed, the battery 13 is connected to the oscillator input and the oscillator is effective to provide a high magnitude alternating voltage at the secondary winding 19 of a transformer 18. Reference numeral 20 designates a voltage doubler rectifier means which is connected to a main storage capacitor 21 to thereby charge this capacitor, the polarity of the charge being indicated.

Reference numeral 22 designates an electronic flash tube. This flash tube is a gas filled device having a pair of main electrodes which are connected directly to the plates of capacitor 21 and having a starting electrode which is connected to a triggering network identified by the reference numeral 23, this network including a trigger transformer 24 and a connector 25 adapted to be connected to the shutter switch of a camera to be used with the photographic flash unit.

Reference numeral 26 identifies a transistor type network which is connected in controlling relation to the winding 16 of relay 15. Transistor network 26 includes a transistor 32. The circuit arrangement of network 26, as will be described, is such that upon initial closing of the on-off switch 14, a forward bias pulse of electrical current is provided to render transistor 32 conductive. As a result, winding 16 of relay 15 is operatively energized and switch 17 is closed. Oscillator 10, including transformer 18 and rectifier 20, is now effective to charge capacitor 21. The circuit arrangement including oscillator 10, transformer 18, and rectifier 20, is capable of charging capacitor 21 to a voltage which is above the operating voltage of this capacitor. However, upon capacitor 21 reaching its operating voltage, R-C network 28 is effective to cause a neon tube 33 to fire and provide a "stop" pulse of electrical current. This current is applied to transistor 32 as a reverse bias current and thereby operatively de-energizes the winding 16 of relay 15. In this manner, capacitor 21 is charged to its operating voltage in a relatively short time, thereby giving quick recycle. Furthermore, the de-energization of relay 15 causes switch 17 to open and the input of oscillator 10 is disconnected from battery 13 to conserve the energy of the battery.

Considering this in greater detail, transistor network 26 is itself controlled by a first and a second resistor-capacitor network, identified respectively by means of the reference numerals 27 and 28. The R-C network 28 is composed of a voltage dividing resistance means including resistors 29 and 30 which are connected in series across capacitor 21. Capacitor 31 is connected in parallel with resistor 30 and therefore the voltage on capacitor 31 at any given time is in part dependent upon the voltage on capacitor 21. The voltage on capacitor 31 is also dependent upon the relative values of the components 29, 30 and 31. These components are selected such that the R-C network 28 can be said to have a relatively short time constant or delay. In other words, as the voltage on capacitor 21 increases, the voltage on capacitor 31 follows this increasing voltage with only a short time delay. When the voltage on capacitor 31 reaches a given value, indicative of the fact that capacitor 21 has reached its operating voltage, a neon tube 33 breaks down to supply a stop or reverse bias to transistor 32.

The resistor-capacitor network 27 is composed of resistors 34 and 35, which are connected in series as a voltage divider across capacitor 21. A capacitor 36 is connected in parallel with resistor 35 and therefore the voltage on capacitor 36 at any given time is in part dependent upon the voltage on capacitor 21. The voltage on capacitor 36 is also dependent upon the relative magnitude of the components 34, 35 and 36. These components are specifically selected to have a relatively long time constant, when compared to the time constant of the R-C network 28. Therefore, the voltage on capacitor 36 at any given time, when compared to the voltage on capacitor 21 at that time, is considerably delayed. In other words, as the voltage on the main storage capacitor 21 builds up over a time period, the voltage on capacitor 36 follows this build up of voltage with considerable time delay, when compared to the manner in which the voltage on capacitor 31 builds up as capacitor 21 charges.

At a time subsequent to the firing of neon tube 33, the voltage on capacitor 36 builds up sufficiently to cause a neon tube 37 to break down. As will be explained, the firing of neon tube 37 supplies a start or forward bias current pulse to transistor 32 to thereby render this transistor again conductive and to again operatively energize the winding 16 of relay 15. Switch 17 is then closed and oscillator 10, transformer 18 and rectifier 20 are again effective to charge capacitor 21.

In this manner, the apparatus, including R-C networks 27 and 28, is effective to cyclically control relay 15 to maintain a charge on capacitor 21.

As is well known, capacitor 21, in its charge condition, may be selectively discharged through flash tube 22 to produce a brilliant flash of light in synchronism with the operation of a camera shutter. The operation of the camera shutter closes a shutter switch which is connected to outlet 25 to actuate the triggering network 23 and thereby ionize the gas within flash tube 22 and allow capacitor 21 to discharge through the flash tube. It is recognized that the discharge of capacitor 21 through flash tube 22 may in fact take place during that portion of the operation of the apparatus in which transistor 32 is nonconductive and relay 15 is de-energized. Therefore, a further starting means in the form of capacitor 38 is provided. This capacitor is connected to capacitor 21 and receives a charge of the polarity indicated. Capacitor 38 is effective to provide a start or forward bias current pulse to transistor 32 and thereby render this transistor conductive to energize relay 15 and recharge capacitor 21 upon capacitor 21 being discharged through the flash tube.

Considering the operation of the apparatus in greater detail, oscillator 10 includes a pair of transistors 11 and 12 which are connected in circuit with a saturable core feedback transformer 39 and in circuit with transformer 18 as an output transformer. Transistors 11 and 12 conduct alternately. Upon the switches 14 and 17 both being in a closed condition, one of these transistors is rendered conductive and the other is rendered nonconductive. Assume that initially transistor 11 is in a conductive state. A current path may now be traced from the positive terminal of battery 13 through switch 14, winding 40, the emitter to collector circuit of transistor 11, winding 41 of transformer 18, and switch 17 to the negative terminal of battery 13. The current flowing in this circuit through winding 40 of transformer 39 induces a voltage in the winding 42 of this transformer which is effective to maintain a forward bias for transistor 11 and thereby maintain this transistor conductive. The current flowing through the winding 40 however induces a reverse of back bias voltage in winding 43 of transformer 39 which biases the emitter to base circuit of transistor 12 to maintain this transistor nonconductive. The transistors 11 and 12 therefore are maintained in this condition, with transistor 11 conductive and transistor 12 nonconductive, until the core of transformer 39 saturates. When this core saturates, the emitter to base driving voltage of transistor 11 is reduced and the emitter to collector current of this transistor decreases. The magnetic flux generated by current flowing through winding 40 therefore decreases and the collapsing magentic flux now induces a voltage in the winding 42 and 43 which is of an opposite polarity and now reverse biases transistor 11 to cut off this transistor. However, transistor 12 is now forward biased and this transistor becomes conductive.

A current flow circuit may now be traced from the positive terminal of battery 13 through switch 14, winding 44, the emitter to collector circuit of transistor 12, winding 45, and switch 17 to the negative terminal of battery 13.

This process continues until the core of transformer 39 again saturates and the circuit then again reverts to the condition wherein transistor 11 is conductive and transistor 12 is nonconductive. In this manner, an alternating voltage is induced in the secondary winding of the output transformer 18.

The above explanation has been concerned specifically with the operation of the oscillator 10. This operation is however initiated by the closing of the on-off switch 14 which is effective to energize the winding of relay 15 and thereby close switch 17 to connect the oscillator to battery 13 and thereby start the oscillator. In order to energize the winding of relay 15, the operation of transistor network 26 must be considered.

The initial closing of the on-off switch 14 causes a forward bias current pulse to flow from the positive terminal of battery 13 through switch 14, winding 40, winding 16 of relay 15, resistor 46, resistor 47, capacitor 48, and conductor 49 to the negative terminal of battery 13. Initially, capacitor 48 is in a discharged condition and therefore the magnitude of this current pulse is limited only by the impedances of winding 40, winding 16, and the values of resistors 46 and 47. The impedance of winding 40 is very low. The voltage developed across resistor 46 in this above traced circuit is such as to place a forward bias across the emitter and base electrodes of transistor 32 and thereby this transistor is rendered conductive. The current flowing through winding 40 also tends to induce a voltage in winding 42 placing a forward bias across the emitter and base electrodes of transistor 11 and thereby this transistor is also rendered conductive. A further current flow circuit may now be traced from the positive terminal of battery 13 through switch 14, winding 40, winding 16, resistor 50, emitter to collector circuit of transistor 32, resistors 51 and 52 connected in parallel with capacitor 48, and conductor 49 to the negative terminal of battery 13. The two current flow circuits thus far traced transmit a transient type current and it will be recognized that capacitor 48 in its discharge condition acts as a shunt across resistors 51 and 52.

The magnitude of the current flowing in the last traced circuit, which includes the emitter and collector electrodes of transistor 32, is of sufficient magnitude to operatively energize the winding 16 of relay 15 and thereby cause switch 17 to close. The closing of switch 17 places a shunt circuit, including conductors 49 and 53, around resistor 52. Therefore, a steady state current now flows which can be traced from the positive terminal of battery 13 through switch 14, winding 40, winding 16, resistor 50, the emitter to collector circuit of transistor 32, resistor 51, conductor 53 and switch 17 to the negative terminal of battery 13.

In this manner, the initial closing of the on-off switch 14 is effective to initially cause a forward bias current pulse to flow through a circuit including winding 40, resistors 46 and 47 and capacitor 48. This initial current pulse is effective to render transistor 11 and transistor 32 conductive. When transistor 32 is rendered conductive a sufficient current flows through its emitter to collector circuit to operatively energize relay 15. Once this relay is operatively energized its switch 17 is closed and a steady state condition is established whereby transistor 32 is maintained continuously conductive and thereby relay 15 is continuously operatively energized. As above described, the closing of relay switch 17 connects battery 13 to oscillator 10 to energize oscillator 10, with transistor 11 forward biased by relay transient current through winding 40 thereby causing transistor 11 to conduct heavily initiating oscillation and this oscillator is effective, in conjunction with rectifier 20, to charge capacitor 21.

As the charge on capacitor 21 builds up, the voltage on this capacitor is applied to the R-C networks 27 and 28. The voltage on capacitors 31 and 36 which form a part of these R-C networks also builds up in a manner determined by the magnitude of the components making up the respective R-C networks. As has been explained, R-C network 28 has a relatively short time constant and therefore the voltage present on capacitor 31 is allowed to follow the voltage on capacitor 21 with a short time delay. As the voltage on capacitor 21 reaches its normal operating voltage, capacitor 31 reaches a voltage such that neon tube 33 fires. Neon tube 33 now effectively acts as a switch which connects the upper positive plate of capacitor 31 through a resistor 54 to the base electrode of transistor 32. This is a reverse bias voltage for the transistor and is effective to render transistor 32 nonconductive. Therefore, the above traced current flow circuit including the emitter to collector electrodes of transistor 32 is effectively opened and the winding 16 of relay 15 is operatively de-energized. The relay switch 17 now opens and is effective to disconnect oscillator 10 from battery 13 so that no battery energy is now provided for the oscillator. The charging of the main storage capacitor 21 is now discontinued.

Capacitor 48 of transistor network 26 is at this time in a charged condition and therefore the first above traced circuit from the positive terminal of battery 13 through switch 14, winding 40, winding 16, resistors 46 and 47, capacitor 48 and conductor 49 to the negative terminal battery 13 is no longer effective to place transistor 32 in a conductive condition. In other words, while a certain low magnitude current may flow through this circuit, the voltage developed across resistor 46 is not of sufficient magnitude to render transistor 32 conductive since capacitor 48 is now charged.

Furthermore, the opening of relay switch 17 is effective to place resistor 52 in the emitter to collector circuit of transistor 32. This resistor, which is a relatively high magnitude resistor, is effective to limit any small emitter to collector current which may flow in transistor 32 to such a value as to maintain the winding 16 of relay 15 operatively de-energized.

The apparatus now remains in this condition, with relay 15 operatively de-energized, until the voltage on capacitor 36 which is included in R-C network 27 reaches a sufficient voltage to cause neon tube 37 to fire. When this neon tube fires, the tube effectively acts as a switch to connect the upper positive plate of capacitor 36 directly to the emitter electrode of transistor 32. This provides a forward bias pulse of electrical current which renders transistor 32 again conductive to energize relay 15, as above described. Therefore, relay switch 17 is again closed and resistor 52 is shunted to establish the steady state emitter to collector current flow circuit for transistor 32 to maintain the relay energized. Furthermore, the closing of switch 17 connects the oscillator to battery 13 and renders the oscillator 10 again effective to charge capacitor 21. The transient relay current through winding 40 temporarily forward biases transistor 11 aiding the tendency of the device to break into oscillation and thus assures restarting of the oscillator. The voltage induced in winding 40 is extremely small having very little effect on the operation of the relay. The magnitude of D.C. relay current flowing through winding 40 is also small and after aiding the starting of the circuit has little effect on the normal operation of the oscillator.

The above description has traced a single cycle of operation wherein the R-C networks 27 and 28 are effective to first disable oscillator 10 and to then again render the oscillator effective to charge capacitor 21. In this manner, oscillator 10 is cycled between its operative and inoperative conditions to maintain capacitor 21 charged with a minimum of energy drain from battery 13.

As has been mentioned, the discharging of capacitor 21 through flash tube 22 is under the control of the shutter switch of an associated camera. Capacitor 38 provides a start or forward bias pulse of electrical current to render transistor 32 conductive in the event that capacitor 21 is discharged through flash tube 22 during that portion of the cycle in which transistor 32 is nonconductive and relay 15 is operatively de-energized. Capacitor 38 is charged from capacitor 21 through a circuit including resistors 47 and 51. Upon capacitor 21 being discharged through flash tube 22, the upper or positive plate of capacitor 38 is effectively directly connected to the terminal identified by the reference numeral 57. The negative plate of capacitor 38 is connected directly to the base electrode of transistor 32. A current flow circuit can therefore be traced from the positive plate of capacitor 38 through capacitor 21, terminal 57, resistor 52, conductor 49, battery 13, switch 14, winding 40, winding 16, resistor 50, the emitter to base circuit of transistor 32, and conductor 58 to the negative plate of capacitor 38. The pulse of current flowing through this circuit is effective to place a forward bias on transistor 32 and this transistor is therefore again rendered conductive such that its emitter to collector current flow circuit is completed to operatively energize the winding 16 of relay 15. Therefore, relay switch 17 is again closed and the main storage capacitor 21 is recharged.

From the above description, it can be seen that I have provided an improved electrical apparatus for use in charging a capacitor having an oscillator which is energized from a low voltage battery wherein the charge on this capacitor is maintained by first and second timing means, which timing means are in turn connected in controlling relationship to a relay to cause this relay to cycle and thereby cyclically connect the oscillator to the low voltage battery to establish a cyclic charging condition for the capacitor to be charged. As a result, the capacitor is maintained charged with a minimum of battery energy. Other modifications of the present invention will be apparent to those skilled in the art and is therefore intended that the scope of the present invention be limited solely by the scope of the appended claims.

I claim as my invention:

1. Electric apparatus for use in charging a capacitor to a high voltage from a low voltage source, comprising; a capacitor to be charged, a low magnitude source of voltage, a relay having a winding and a normally open switch, electrical inverter means having a high voltage output, circuit means controlled by said relay switch connecting said source of voltage to said inverter means to thereby utilize energy of said source of voltage to energize said inverter means only when said relay is energized, means connecting said capacitor to the output of said inverter means, control means having an input and an output, circuit means connecting said relay winding to the output of said control means to be normally energized thereby, a first R-C timing network having a relatively short time constant, means connecting said first R-C timing network in controlling relation to the input of said control means to cause said relay winding to be de-energized when said capacitor is charged to a given value to thereby discontinue the charging of said capacitor, a second R-C timing network having a relatively long time constant, means connecting said second R-C timing network to said capacitor, and means connecting said second R-C timing network in controlling relation to the input of said control means to cause said relay to be again energized a time period after de-energization thereof to thereby re-establish the charging of said capacitor.

2. Electric apparatus for use in charging a capacitor to a high voltage from a low voltage source comprising; a capacitor to be charged, a low magnitude source of voltage, a relay having an actuating winding and a normally open switch controlled thereby, inverter means having a low voltage input and a high voltage output, circuit means connecting said capacitor to the output of said inverter means, circuit means controlled by said relay switch to connect the input of said inverter means to said source of voltage only when said relay is energized such that said inverter means is effective to charge said capacitor only upon said relay being energized, control means having an input and an output, circuit means connecting said relay winding to the output of said control means in a manner to cause said relay to be energized, a first R-C timing network having a relatively short time constant, means connecting said first R-C timing network to said capacitor to energize said first R-C timing network in accordance with the state of charge of said capacitor, means connecting said first R-C timing network in controlling relation to the input of said control means to cause said relay to be de-energized upon said capacitor being charged to a given value, said first R-C timing network thereby being effective to render said inverter means ineffective to continue the charging of said capacitor, a second R-C timing network having a relatively long time constant, means connecting said second R-C timing network to said capacitor, and means connecting said second R-C timing network in controlling relation to the input of said control means to thereby cause said relay to assume said energized condition a time period after the functioning of said first R-C timing network, said second R-C timing network thereby rendering said inverter means effective to again charge said capacitor.

3. Electrical apparatus for charging a capacitor to a high voltage from a low voltage source comprising; a capacitor to be charged, a low magnitude source of voltage, a relay having a winding and a normally open switch, converter means having a low voltage input and a high voltage output, circuit means controlled by said relay switch connecting said source of voltage to said low voltage input, circuit means connecting said high voltage output to said capacitor to thereby charge said capacitor upon said relay switch assuming a closed condition, amplifying means having an input and an output, circuit means connecting said relay winding to the output of said amplifying means in a manner to cause said relay switch to normally assume a closed condition, first timing means having a relatively short time period, circuit means connecting said first timing means to said capacitor to energize said first timing means in accordance with the state of charge of said capacitor, further means connecting said first timing means to the input of said amplifying means to thereby cause said amplifying means to assume a condition wherein said relay switch assumes an open condition upon said capacitor reaching a given state of charge, second timing means having a relatively long timing period, circuit means connecting said second timing means to said capacitor, and further circuit means connecting said second timing means to the input of said amplifying means to thereby cause said amplifying means to assume a condition wherein said relay switch assumes a closed condition a time period after the opening of said switch due to the action of said first timing means, said first and second timing means thereby being cyclically effective to maintain a charge on said capacitor.

4. Photographic power supply apparatus for converting a low voltage source to a high voltage for charging a capacitor, comprising; oscillator means having input terminals adapted to be connected to a low voltage source and having output terminals providing an alternating voltage output, means including rectifying means connecting the output terminals of said oscillator means to a capacitor to thereby charge said capacitor, a relay having an actuating winding and a normally open switch, circuit means controlled by said relay switch adapted to connect the input terminals of said oscillator to a low voltage source, said relay switch when in an open condition being operative to disconnect said input terminals from the low voltage source and thereby disable said oscillator, control means connected in controlling relation to said relay winding and effective to normally maintain said relay winding energized to thereby cause said relay switch to close and said capacitor to be charged, a first pulsing circuit having a relatively short time period, means connecting said first pulsing circuit to said capacitor to thereby energize said first pulsing circuit in accordance with the voltage on said capacitor, circuit means connecting said first pulsing circuit in controlling relation to said control means in a manner to cause said relay winding to be de-energized upon said capacitor reaching a predetermined voltage, a second pulsing circuit having a relatively long time period, circuit means connecting said second pulsing circuit to said capacitor, and further circuit means connecting said second pulsing circuit in controlling relation to said control means in a manner to cause said relay winding to be subsequently energized to again establish a charging condition for said capacitor, said first and second pulsing circuits cyclically functioning to maintain the charge on said capacitor with a minimum of energy drain from the low voltage source.

5. Electric apparatus for use in charging the main storage capacitor of an electronic photographic flash unit from a low voltage battery, comprising; a capacitor to be charged, a low voltage battery, a relay having a winding and a normally open switch, a normally open main control switch, voltage transforming means having a low voltage input and a high voltage output, circuit means completed by said main control switch and said relay switch when both are closed adapted to connect the input of said voltage transforming means to said battery, circuit means connecting the output of said voltage transforming means to said capacitor to thereby charge said capacitor to a high voltage upon said main control switch and said relay switch being in a closed condition, transistor network means having an input and an output, circuit means connecting said relay winding to the output of said transistor network means to be energized upon said transistor network means being rendered conductive, further circuit means completed by said control switch when closed and including biasing means arranged to render said transistor network normally conductive upon said main control switch being closed so that the initial closing of said main control switch renders said transistor network conductive and thereby energizes said relay to close said relay switch and cause said capacitor to be charged, a first R-C timing network connected to said capacitor and having a relatively short time constant, circuit means connecting said first R-C timing network in controlling relation to the input of said transistor network in a manner to render said transistor network nonconductive upon said capacitor being charged to a given value, to thereby de-energize said relay winding and open said relay switch, a second R-C timing network connected to said capacitor and having a relatively long time constant, and further circuit means connecting said second R-C timing network in controlling relation to the input of said transistor network in a manner to render said transistor network conductive and thereby again energize said relay winding.

References Cited in the file of this patent

UNITED STATES PATENTS

| | | |
|---|---|---|
| 2,748,274 | Pearlman | May 29, 1956 |
| 2,852,730 | Magnuski | Sept. 16, 1958 |
| 2,873,409 | Most | Feb. 10, 1959 |
| 2,877,385 | Rock | Mar. 10, 1959 |